(12) United States Patent
Aznag et al.

(10) Patent No.: US 12,027,835 B2
(45) Date of Patent: Jul. 2, 2024

(54) TELECOMMUNICATIONS ENCLOSURE INCLUDING CONTAINMENT STRUCTURES FOR O-RINGS

(71) Applicant: COMMSCOPE TECHNOLOGIES LLC, Hickory, NC (US)

(72) Inventors: Mohamed Aznag, Scherpenheuvel-Zichem (BE); Samory De Zitter, Mechelen (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 190 days.

(21) Appl. No.: 17/761,901

(22) PCT Filed: Sep. 17, 2020

(86) PCT No.: PCT/US2020/051285
§ 371 (c)(1),
(2) Date: Mar. 18, 2022

(87) PCT Pub. No.: WO2021/055615
PCT Pub. Date: Mar. 25, 2021

(65) Prior Publication Data
US 2022/0329058 A1 Oct. 13, 2022

Related U.S. Application Data

(60) Provisional application No. 62/903,384, filed on Sep. 20, 2019.

(51) Int. Cl.
*H02G 15/013* (2006.01)
*G02B 6/44* (2006.01)
*H02G 15/115* (2006.01)

(52) U.S. Cl.
CPC ......... *H02G 15/013* (2013.01); *G02B 6/4444* (2013.01); *H02G 15/115* (2013.01)

(58) Field of Classification Search
None
See application file for complete search history.

(56) References Cited

U.S. PATENT DOCUMENTS 3,557,299 A * 1/1971 Zoltan ............... H02G 15/076
277/606
3,572,452 A * 3/1971 Winberg ............... F16C 33/76
175/371

(Continued)

FOREIGN PATENT DOCUMENTS

EP 0 873 535 B1 10/2001
EP 2 657 579 A1 10/2013

(Continued)

OTHER PUBLICATIONS

International Search Report and Written Opinion of the International Searching Authority for International Patent Application No. PCT/US2020/051285, dated Jan. 4, 2021, 9 pages.

(Continued)

*Primary Examiner* — Krystal Robinson
(74) *Attorney, Agent, or Firm* — Merchant & Gould P.C.

(57) ABSTRACT

A telecommunications enclosure is disclosed. In one example, the telecommunications enclosure includes an upper dome and a lower base. An O-ring seal can be compressed between a sealing surface of the upper dome and/or a sealing surface of the lower base to provide sealing therebetween.

12 Claims, 11 Drawing Sheets

(56) References Cited

U.S. PATENT DOCUMENTS

| | | | | |
|---|---|---|---|---|
| 3,584,887 | A * | 6/1971 | Brown | F16J 15/38 |
| | | | | 277/385 |
| 3,728,467 | A * | 4/1973 | Klayum | H02G 15/06 |
| | | | | 174/76 |
| 3,755,614 | A * | 8/1973 | Jakacki | H02G 3/088 |
| | | | | 174/59 |
| 5,210,374 | A * | 5/1993 | Channell | H02G 15/076 |
| | | | | 174/77 R |
| 5,288,946 | A * | 2/1994 | Jackson | H02G 15/007 |
| | | | | 174/38 |
| 5,541,363 | A * | 7/1996 | Weise | H02G 3/088 |
| | | | | 174/653 |
| 5,582,477 | A * | 12/1996 | Reinert, Sr. | F21V 21/116 |
| | | | | 40/565 |
| 5,880,400 | A * | 3/1999 | Leischner | H02B 1/28 |
| | | | | 174/17 CT |
| 8,249,411 | B2 * | 8/2012 | Burke | G02B 6/4442 |
| | | | | 385/135 |
| 8,519,263 | B2 * | 8/2013 | Schilling | H02G 9/10 |
| | | | | 187/346 |
| 11,619,790 | B2 * | 4/2023 | Radelet | H02G 15/013 |
| | | | | 385/135 |
| 2001/0040037 | A1 * | 11/2001 | Negishi | H05K 5/061 |
| | | | | 174/17 CT |
| 2008/0073118 | A1 | 3/2008 | Drotleff et al. | |
| 2008/0224419 | A1 * | 9/2008 | Mullaney | H02G 3/22 |
| | | | | 277/602 |
| 2008/0230996 | A1 | 9/2008 | Sylvan | |
| 2014/0292060 | A1 | 10/2014 | Phillis et al. | |
| 2018/0183175 | A1 | 6/2018 | Coenegracht et al. | |

FOREIGN PATENT DOCUMENTS

| | | |
|---|---|---|
| KR | 10-2010-0055353 A | 5/2010 |
| WO | 2008/112118 A2 | 9/2008 |
| WO | 2017/046065 A1 | 3/2014 |
| WO | 2014/128137 A2 | 8/2014 |
| WO | 2018/234579 A1 | 12/2018 |

OTHER PUBLICATIONS

Extended European Search Report for Application No. 20864793.3 dated Sep. 11, 2023.

* cited by examiner

TELECOMMUNICATIONS ENCLOSURE INCLUDING CONTAINMENT STRUCTURES FOR O-RINGS

CROSS-REFERENCE TO RELATED APPLICATION

This application is a National Stage Application of PCT/US2020/051285, filed on Sep. 17, 2020, which claims the benefit of U.S. Patent Application Ser. No. 62/903,384, filed on Sep. 20, 2019, the disclosures of which i-s are incorporated herein by reference in their entireties. To the extent appropriate, a claim of priority is made to each of the above disclosed applications.

TECHNICAL FIELD

The present disclosure relates generally to sealed telecommunications enclosures.

BACKGROUND

Telecommunications systems typically employ a network of telecommunications cables capable of transmitting large volumes of data and voice signals over relatively long distances. The telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures are adapted to house and protect telecommunications components such as splices, termination panels, power splitters and wavelength division multiplexers.

It is often preferred for the telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to re-seal the enclosures. Other telecommunications enclosures take the form of elongated sleeves formed by wrap-around covers or half-shells having longitudinal edges that are joined by clamps or other retainers. Still other telecommunications enclosures include two half-pieces that are joined together through clamps, latches, or other structures. Still other enclosures can each include a dome secured to a base by a clamp such as a V-band clamp.

SUMMARY

One aspect of the present disclosure relates to a telecommunications enclosure that includes an upper dome that has a cylindrical lower end centered about a central axis and a lower base that mounts at the cylindrical lower end. The lower base can include a seal channel that encircles the central axis when the lower base is mounted at the lower end of the upper dome. The seal channel may have an open top opposite from a channel bottom surface. The channel bottom surface can extend radially outwardly to an outer circumferential lip that projects upwardly from the channel bottom surface.

In certain examples, the channel bottom surface may angle upwardly as the channel bottom surface extends radially away from the central axis to the outer circumferential lip.

The lower end of the upper dome and an upper end of the lower base can include outer flanges that extend circumferentially about the central axis and that are adjacent to one another when the upper dome and the lower base are mounted together.

The telecommunications enclosure may also include an O-ring seal that mounts in the seal channel and may be compressed between the upper dome and the lower base to provide sealing thereinbetween.

The telecommunications enclosure may also include a clamp that mounts about the outer flanges of the upper dome and the lower base. The clamp may define a clamp channel that receives the outer flanges.

Another aspect of the present disclosure relates to a telecommunications enclosure that includes an upper dome that has a cylindrical lower end centered about a central axis and a lower base that mounts at the cylindrical lower end. The lower base may include a sealing surface that encircles the central axis when the lower base is mounted at the lower end of the upper dome.

The lower end of the upper dome and an upper end of the lower base can include outer flanges that extend circumferentially about the central axis and that are adjacent to one another when the upper dome and the lower base are mounted together.

The telecommunications enclosure can also include an O-ring seal that is compressed between the upper dome and the lower base to provide sealing thereinbetween.

The telecommunications enclosure can also include a clamp that mounts about the outer flanges of the upper dome and the lower base. The clamp can define a clamp channel that receives the outer flanges.

The upper dome can include a sealing surface that opposes the sealing surface of the sealing channel when the lower base is mounted to the upper dome. The O-ring seal can be compressed between the sealing surface of the upper dome and the sealing surface of the lower base.

In certain examples, the sealing surface of the base can angle upwardly as the sealing surface of the lower base extends radially away from the central axis or the sealing surface of the upper dome can angle downwardly as the sealing surface of the upper dome extends radially away from the central axis.

In certain examples, the sealing surface of the base can angle upwardly as the sealing surface of the lower base extends radially away from the central axis and the sealing surface of the upper dome can angle downwardly as the sealing surface of the upper dome extends radially away from the central axis.

A further aspect of the present disclosure relates to a telecommunications enclosure. The telecommunications enclosure can include a dome that has an open end and a closed end. The telecommunications enclosure can also include a hollow base that mounts at the open end of the dome with the base and the dome aligned along a common central axis. The base can include a seal channel that extends around the central axis. The seal channel can have an open side opposite from a channel bed. The channel bed can extend outwardly from the central axis to an outer lip that projects from the channel bed in a direction toward the dome.

In certain examples, the channel bed can angle towards the dome as the channel bed extends away from the central axis to the outer lip and the outer lip can extend about the central axis.

The dome and the base can include outer flanges that extend about the central axis and that are adjacent to one another when the dome and the base are mounted together.

The telecommunications enclosure can further include a seal that mounts in the seal channel and is compressed between the dome and the channel bed of the base to provide sealing therebetween.

In certain examples, the telecommunications enclosure can include a clamp that mounts about the outer flanges of the dome and the base. The clamp can define a clamp channel that receives the outer flanges of the dome and the base.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like parts.

Aspects of the present disclosure relate to seal containment and compression features adapted to enhance seal reliability for enclosures (e.g., enclosures including domes secured to bases).

Figure 1:
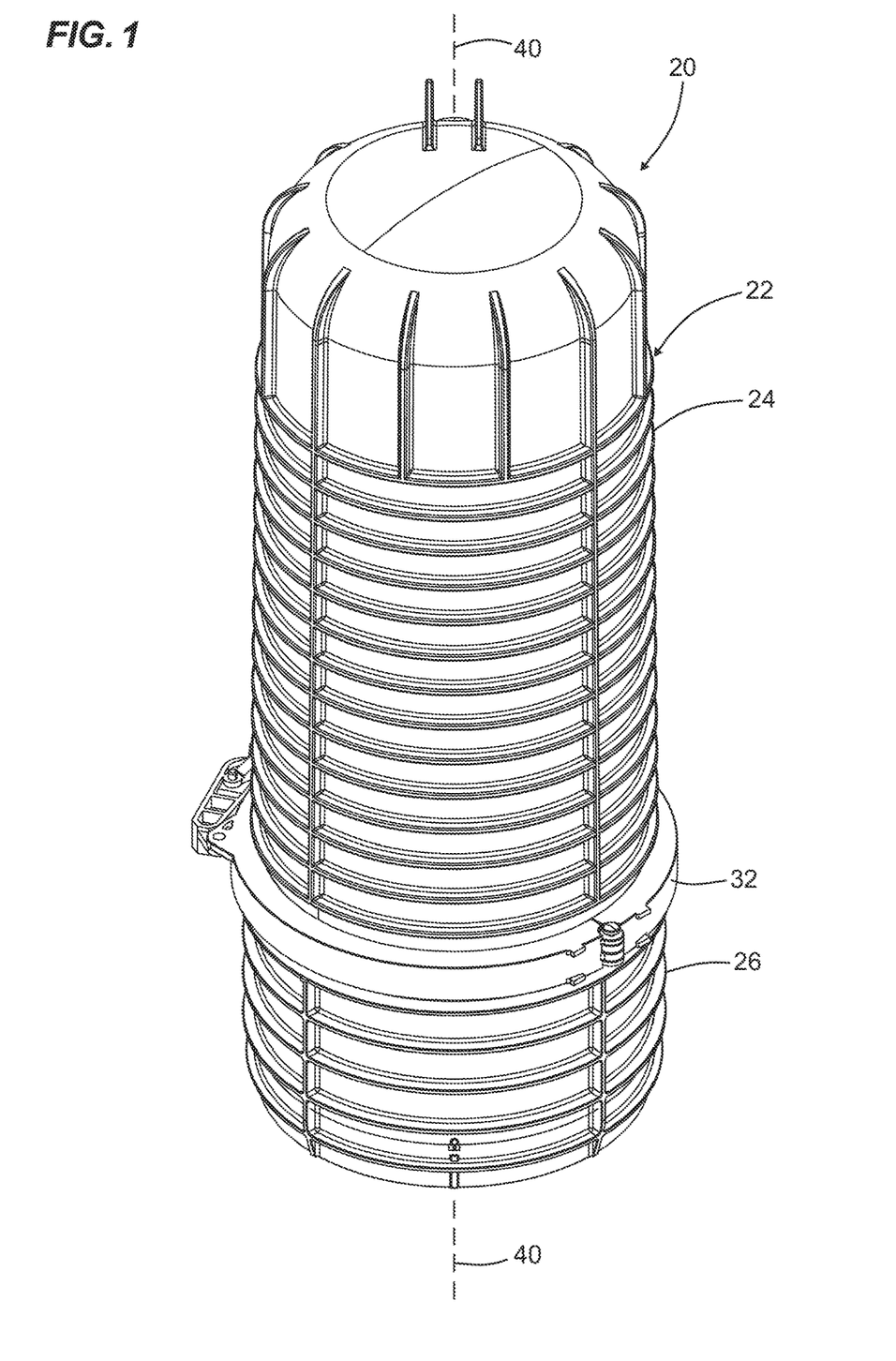
FIG. 1 illustrates a telecommunications enclosure in accordance with the principles of the present disclosure.
Figure 2:
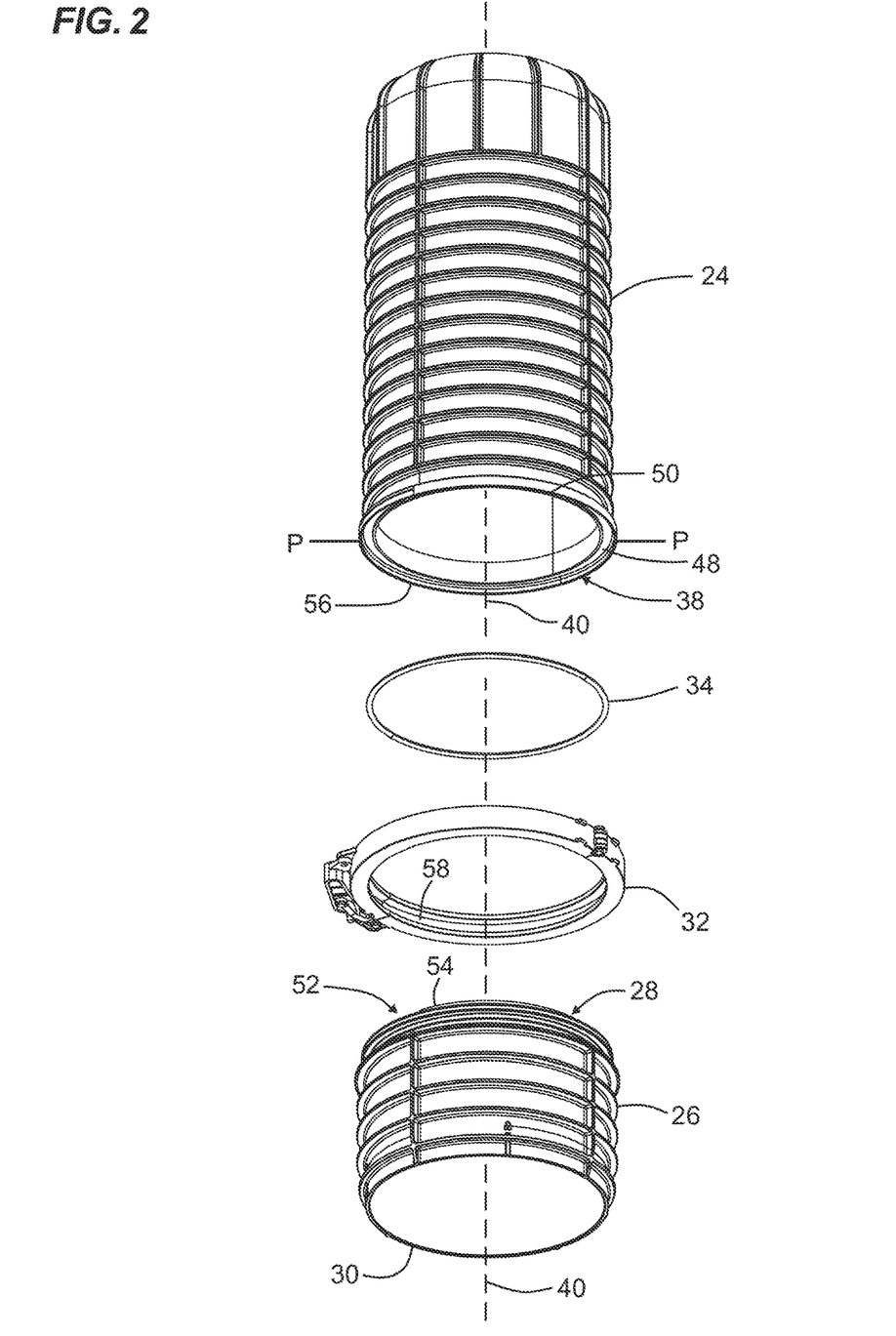
FIG. 2 is an exploded view of the telecommunications enclosure of FIG. 1 including a seal and a clamp.
Figure 3:
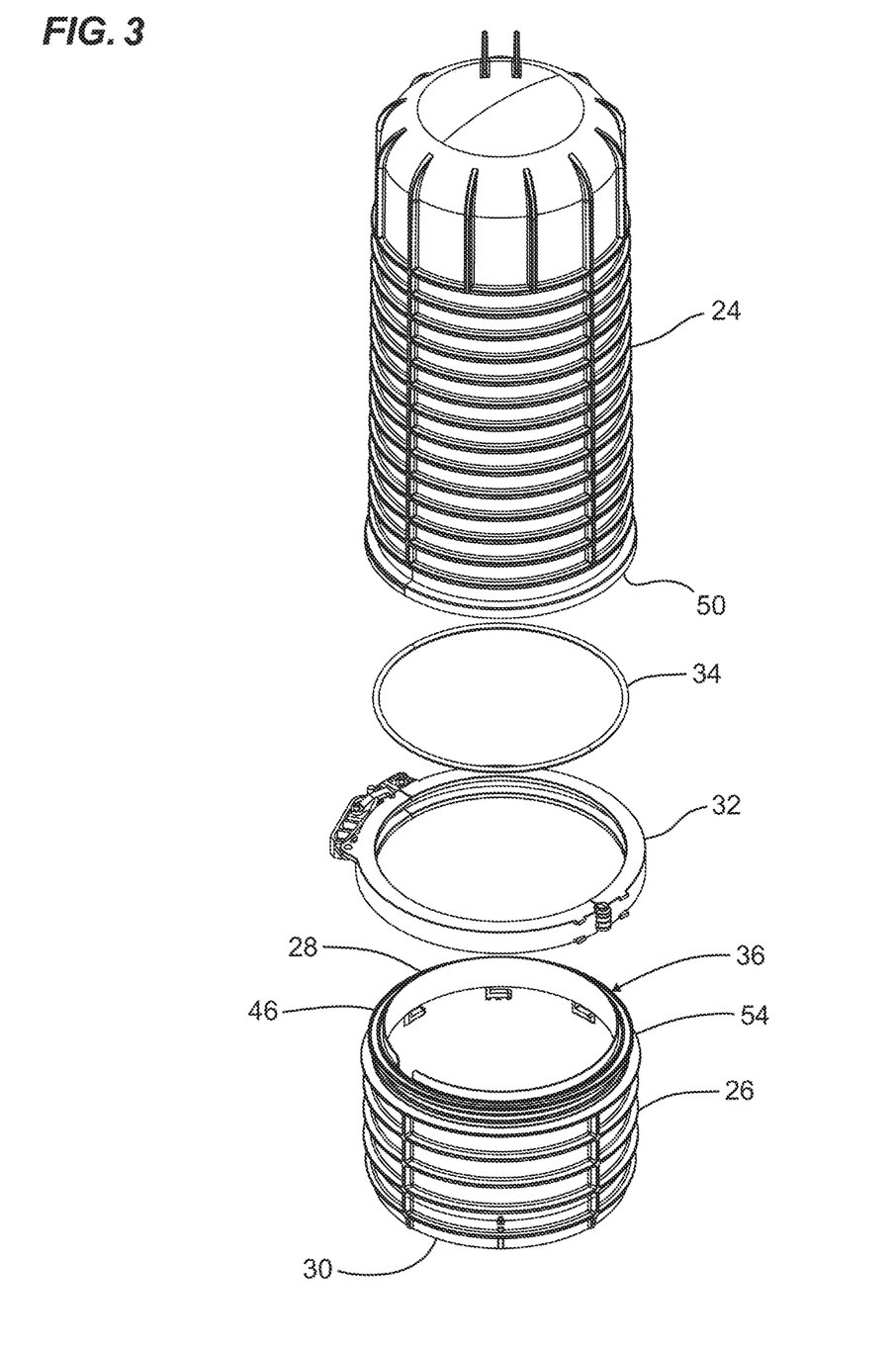
FIG. 3 is a further exploded view of the telecommunications enclosure of FIG. 1.

FIGS. 1-3 illustrate a telecommunications enclosure 20 including a housing 22. In one example, the housing 22 includes a dome 24 (e.g., upper dome) that attaches to a base 26 (e.g., lower base). A telecommunications assembly unit (not shown) can be adapted to be housed within the housing 22. An example telecommunications assembly unit is disclosed by International Publication Number WO 2018/234579A1. The entirety of International Publication Number WO 2018/234579A1 is incorporated by reference herein.

The base 26 can include a first end 28 adapted for connection to the dome 24 and an opposite, second end 30. In one example, the first end 28 can connect to the dome 24 by means such as a clamp 32. In certain examples, the clamp 32 is oval, although alternatives are possible. An environmental seal 34, such as, an O-ring can be provided between the base 26 and the dome 24 (e.g., in a seal channel 36 in the base 26) to form an environmental seal between the base 26 and the dome 24. The dome 24 can have a cylindrical lower end 38 centered about a central axis 40. While the dome 24 and the base 26 have been depicted having circular cross-sectional shapes, in other examples the cross-sectional shapes could be non-circular (e.g., elongated).

Figure 4:
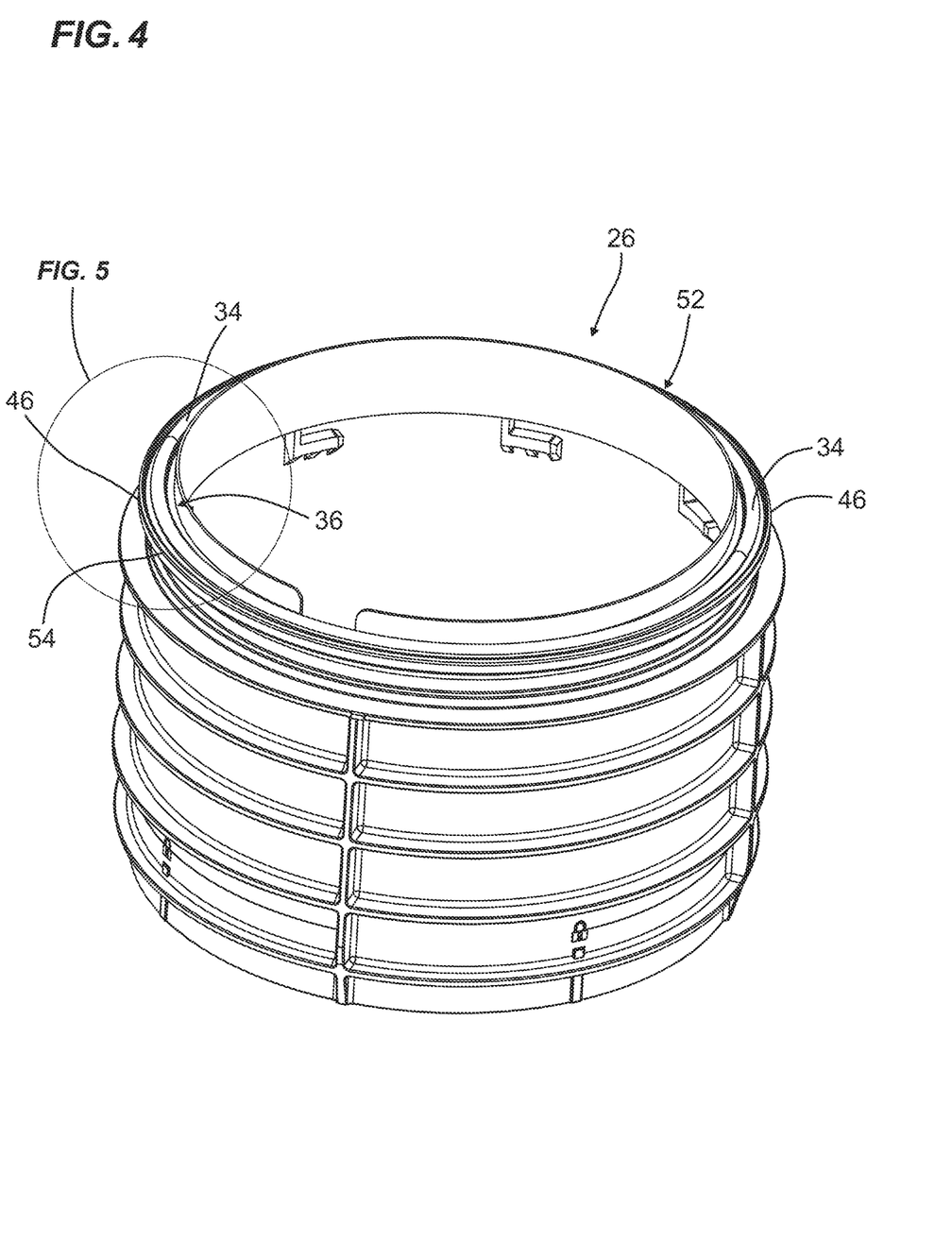
FIG. 4 is a perspective view of a lower base of the telecommunications enclosure of FIG. 1 with the seal.
Figure 5:
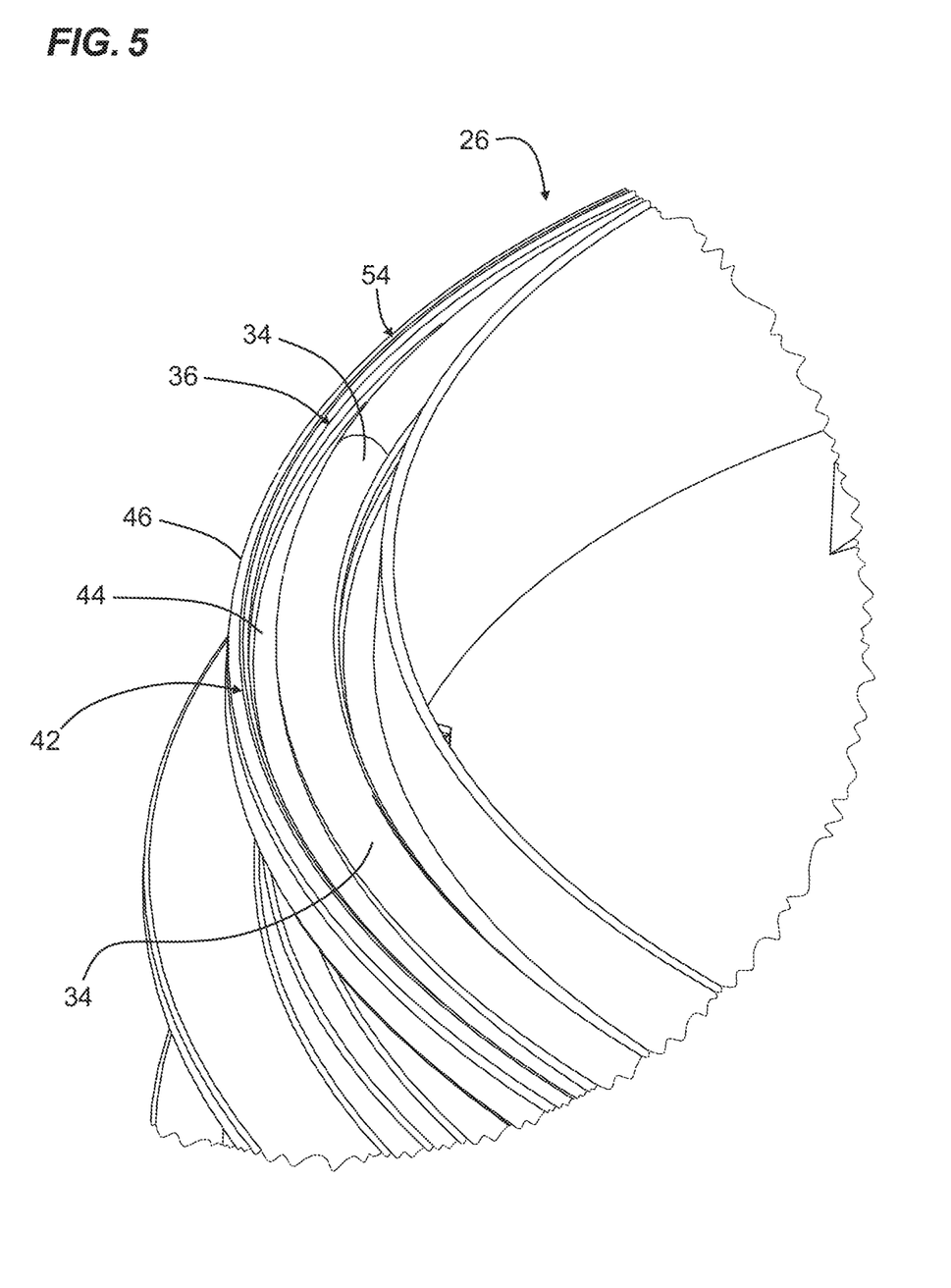
FIG. 5 is an enlarged perspective view of a portion of the lower base of FIG. 4.

Turning to FIGS. 4-5, the base 26 can be adapted to mount at the cylindrical lower end 38 of the dome 24. The seal channel 36 of the base 26 can be configured to encircle the central axis 40 when the base 26 is mounted at the cylindrical lower end 38 of the dome 24. In certain examples, the seal channel 36 has a channel bottom surface 44 (e.g., a sealing surface) that encircles the central axis 40 when the base 26 is mounted at the cylindrical lower end 38 of the dome 24.

The seal channel 36 can have an open top 42 opposite from the channel bottom surface 44. The channel bottom surface 44 of the seal channel 36 can extend radially outwardly to an outer circumferential lip 46 (e.g., an upwardly extending circumferential lip, containment lip) that projects upwardly from the channel bottom surface 44. The outer circumferential lip 46 can be arranged and configured to function as a wall or border about the base 26 such that the environmental seal 34 positioned within the seal channel 36 does not shift or move when the clamp 32 is tightened to mount the dome 24 and the base 26 together (e.g., the environmental seal does not extrude outwardly between the flanges when compressed; but instead containment of the seal is maintained).

In certain examples, the dome 24 can include a seal containment surface 48 (e.g., a sealing surface) that encloses the open top 42 of the seal channel 36 when the base 26 is mounted to the dome 24. The seal containment surface 48 can be oriented along a reference plane P perpendicular relative to the central axis 40.

Figure 11:
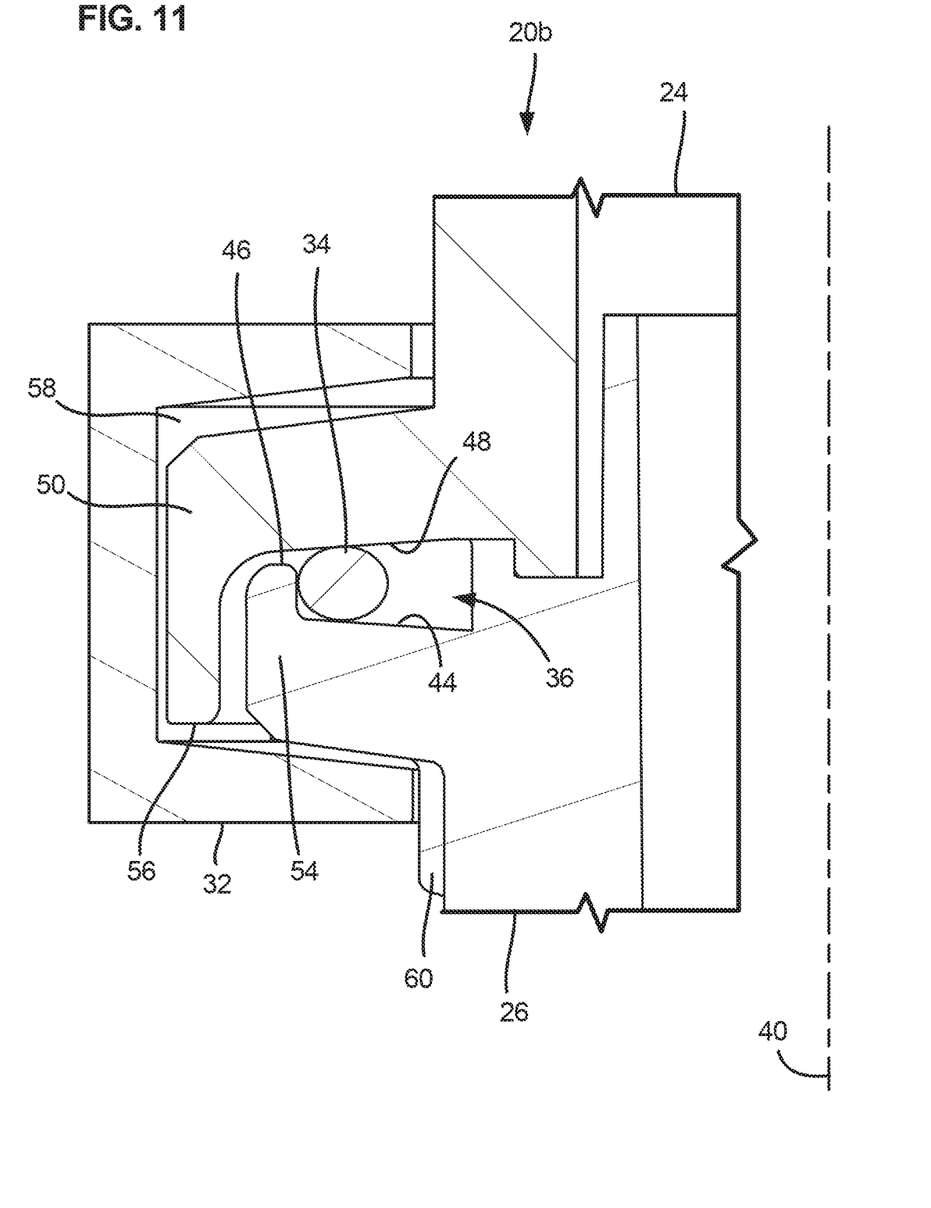
FIG. 11 is an enlarged view of a portion of the telecommunications enclosure of FIG. 10 showing the seal in a compressed state in accordance with the principles of the present disclosure.

In a preferred example, the environmental seal 34 is an O-ring seal having a circular cross-sectional shape prior to being compressed between the base 26 and the dome 24. When the O-ring seal is compressed during sealing, the circular cross-sectional shape deforms to an elongate, obround shape (see FIG. 11). In other examples, the environmental seal 34 may have other cross-sectional shapes.

Figure 6:
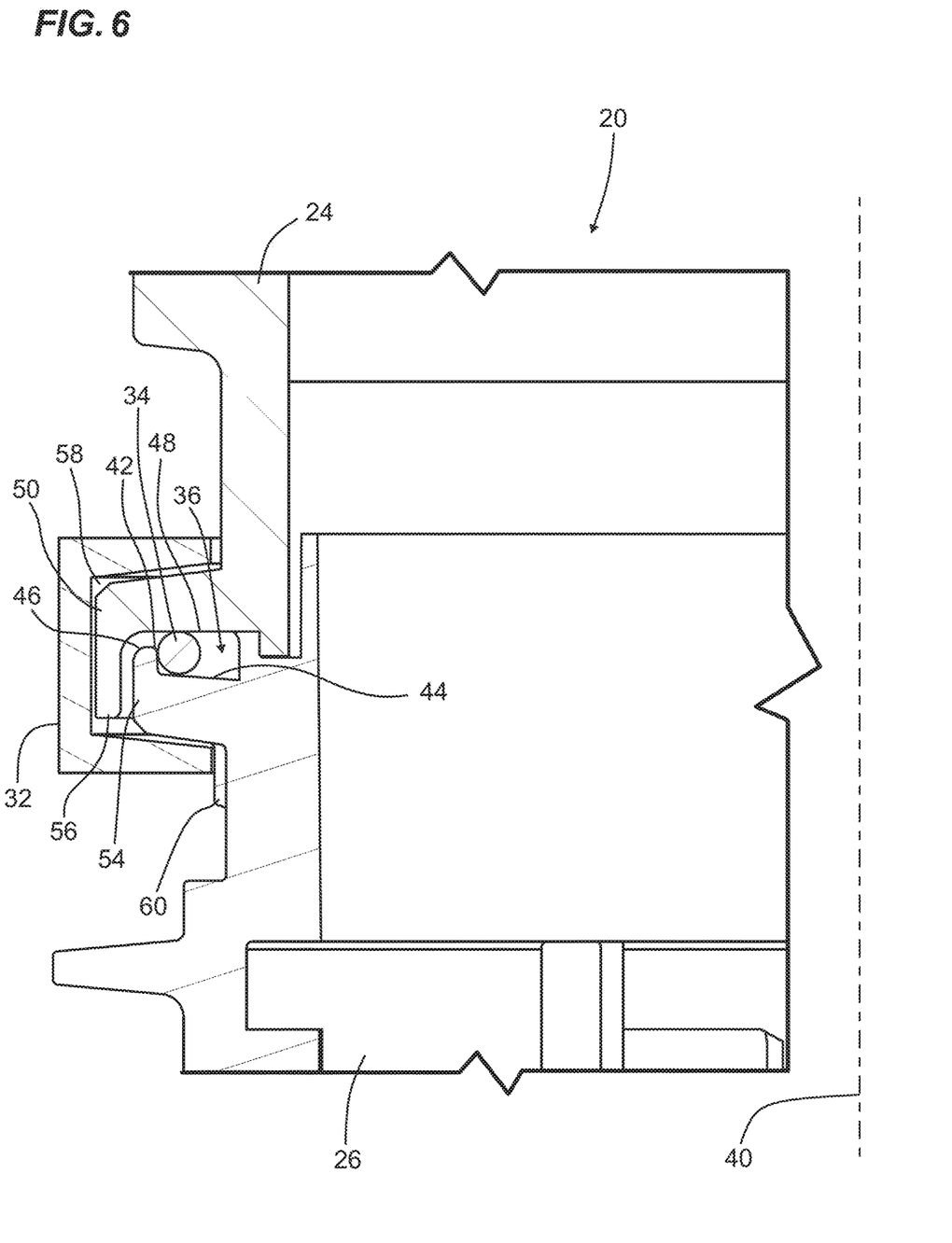
FIG. 6 is a cross-sectional schematic view of a portion of the telecommunications enclosure of FIG. 1 with the seal.
Figure 7:
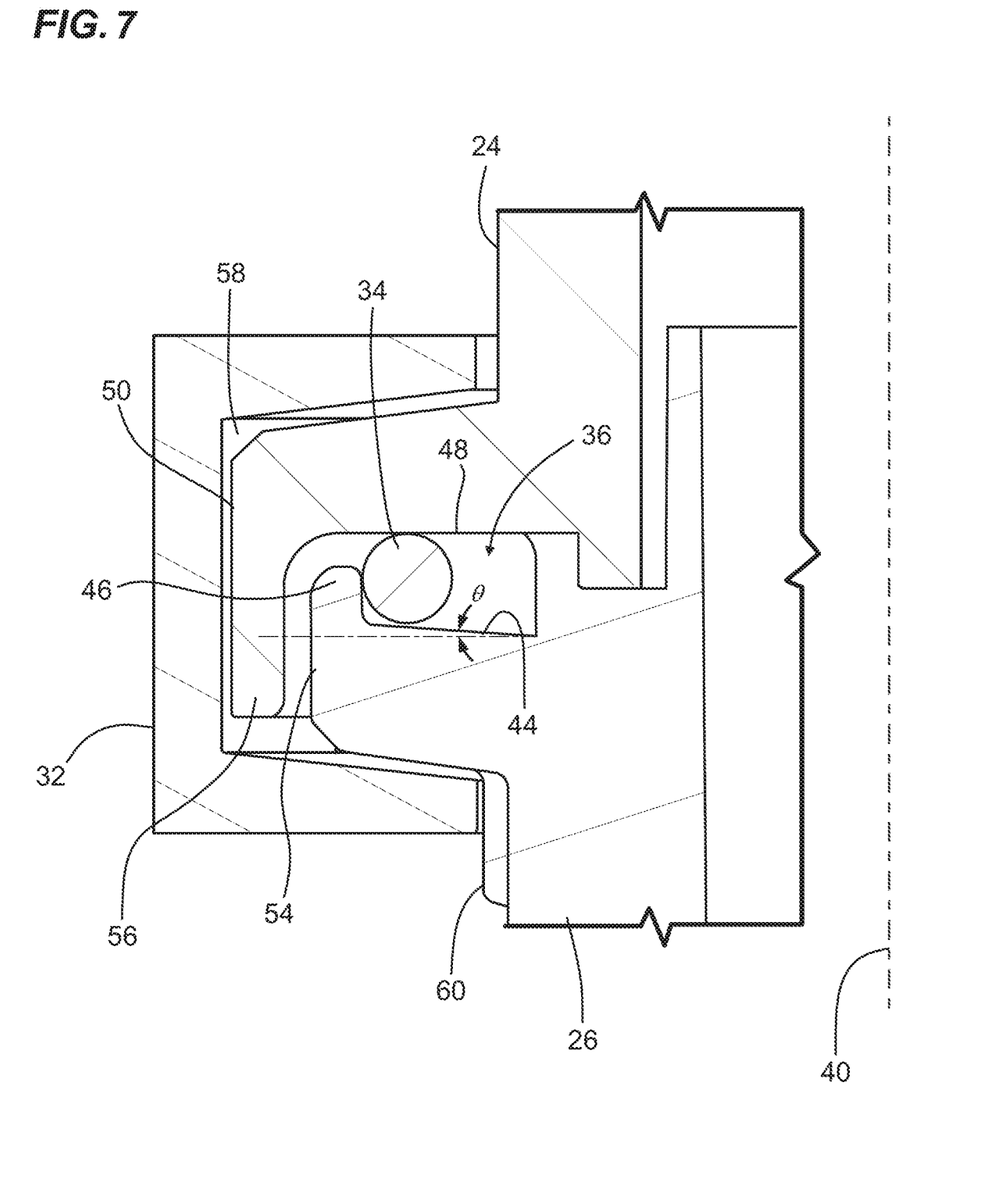
FIG. 7 is an enlarged view of a portion of the telecommunications enclosure of FIG. 6.

Turning to FIGS. 6-7, the channel bottom surface 44 of the base 26 angles upwardly as the channel bottom surface 44 of the base 26 extends radially away from the central axis 40 to the outer circumferential lip 46, although alternatives are possible. The angled surface of the channel bottom surface 44 is advantageous in situations where containment of the environmental seal 34 is needed when the dome 24 and the base 26 are mounted together. While the outer circumferential lip 46 can help to contain the environmental seal 34, the angled channel bottom surface 44 can function to also help prevent the environmental seal 34 from moving out too far when the clamp 32 is tightened over the dome 24 and the base 26. That is, when the clamp 32 is tightened to push the dome 24 and the base 26 together, the environmental seal 34 positioned in the seal channel 36 can be compressed therebetween. In certain examples, the environmental seal 34 can be compressed to an oval shape.

The channel bottom surface 44 can be configured such that when the environmental seal 34 starts to move, the environmental seal 34 can contact the channel bottom surface 44 which can be arranged and configured in an upwardly angle to help contain and compress the environmental seal 34 within the seal channel 36 and prevent movement therefrom. If the channel bottom surface 44 were not angled, there may be a greater risk of the environmental seal 34 being adapted to move parallel to the channel bottom surface 44 and extrude out of the seal channel 36.

In certain examples, the channel bottom surface 44 may have an inclination angle θ of at least 2 degrees to help contain the environmental seal 34 when the dome 24 and the base 26 are mounted together, although alternatives are possible. In certain examples, the channel bottom surface 44 may have an inclination angle θ of at least 3 degrees to help contain the environmental seal 34 when the dome 24 and the base 26 are mounted together, although alternatives are possible. In certain examples, the channel bottom surface 44 may have an inclination angle θ of at least 4 degrees to help contain the environmental seal 34 when the dome 24 and the base 26 are mounted together, although alternatives are possible. In certain examples, the channel bottom surface 44 may have an inclination angle θ of at least 5 degrees to help contain the environmental seal 34 when the dome 24 and the base 26 are mounted together, although alternatives are possible.

In certain examples, the channel bottom surface 44 may have an inclination angle θ of 2 degrees to provide more compression of the environmental seal 34 when the dome 24 and the base 26 are mounted together, although alternatives are possible. In certain examples, the channel bottom surface 44 may have an inclination angle θ of 3 degrees to provide more compression of the environmental seal 34 when the dome 24 and the base 26 are mounted together, although alternatives are possible. In certain examples, the channel bottom surface 44 may have an inclination angle θ of 4 degrees to provide more compression of the environmental seal 34 when the dome 24 and the base 26 are mounted together, although alternatives are possible. In certain examples, the channel bottom surface 44 may have an inclination angle θ of 5 degrees to provide more compression of the environmental seal 34 when the dome 24 and the base 26 are mounted together, although alternatives are possible.

The cylindrical lower end 38 of the dome 24 can include an outer flange 50 (e.g., upper flange) that extends circumferentially about the central axis 40. An upper end 52 of the base 26 can also include an outer flange 54 (e.g., lower flange) that extends circumferentially about the central axis 40. When the dome 24 and the base 26 are mounted together, the outer flange 50 of the dome 24 and the outer flange 54 of the base 26 are positioned adjacent to one another. The dome 24 can include a downwardly projection circumferential lip 56 (e.g., a downwardly extending circumferential lip, containment lip) that extends outside and exterior of the outer circumferential lip 46 of the base 26.

In certain examples, at least one of the dome 24 or the base 26 includes a containment lip that circumferentially surrounds the environmental seal 34. That is, the dome 24 can include the downwardly extending circumferential lip 56 or the base 26 can include the upwardly extending circumferential lip 46 (see FIG. 3). The upwardly and downwardly extending circumferential lips 56, 46 can overlap one another when the dome 24 and the base 26 are secured together.

Still referring to FIGS. 6-7, the environmental seal 34 is shown mounted in the seal channel 36 and compressed between the dome 24 and the base 26 to provide a seal thereinbetween.

The clamp 32 can be adapted to mount about the outer flange 50 of the dome 24 and the outer flange 54 of the base 26. The clamp 32 can define a clamp channel 58 (see FIG. 2) that can be configured to respectively receive the outer flanges 50, 54 of the dome 24 and the base 26. In certain examples, the outer flange 50 of the dome 24 and the outer flange 54 of the base 26 can move less than 2 millimeters relative to the clamp 32 after tightening of the clamp 32, although alternatives are possible. In certain examples, the outer flange 50 of the dome 24 and the outer flange 54 of the base 26 can move no more than 3 millimeters relative to the clamp 32 after tightening of the clamp 32, although alternatives are possible.

In certain examples, the base 26 of the telecommunications enclosure 20 can include additional structure 60 to provide an increased thickness about the base 26. The advantageous feature of having the structure 60 provides for a tighter fit between the clamp 32 and the base 26. As such, there can be less movement between the housing 22 and the clamp 32 due to the larger diameter of the base 26 that provides for better engagement with the clamp 32. That is, the base 26 can be sized sufficiently to enhance the fitting of the clamp 32 when mounted thereon. The structure 60 can improve the securement of the clamp 32 on the base 26 which in turn can help to prevent any shifting of the clamp 32 when the telecommunications enclosure 20 is laid on the side.

Figure 8:
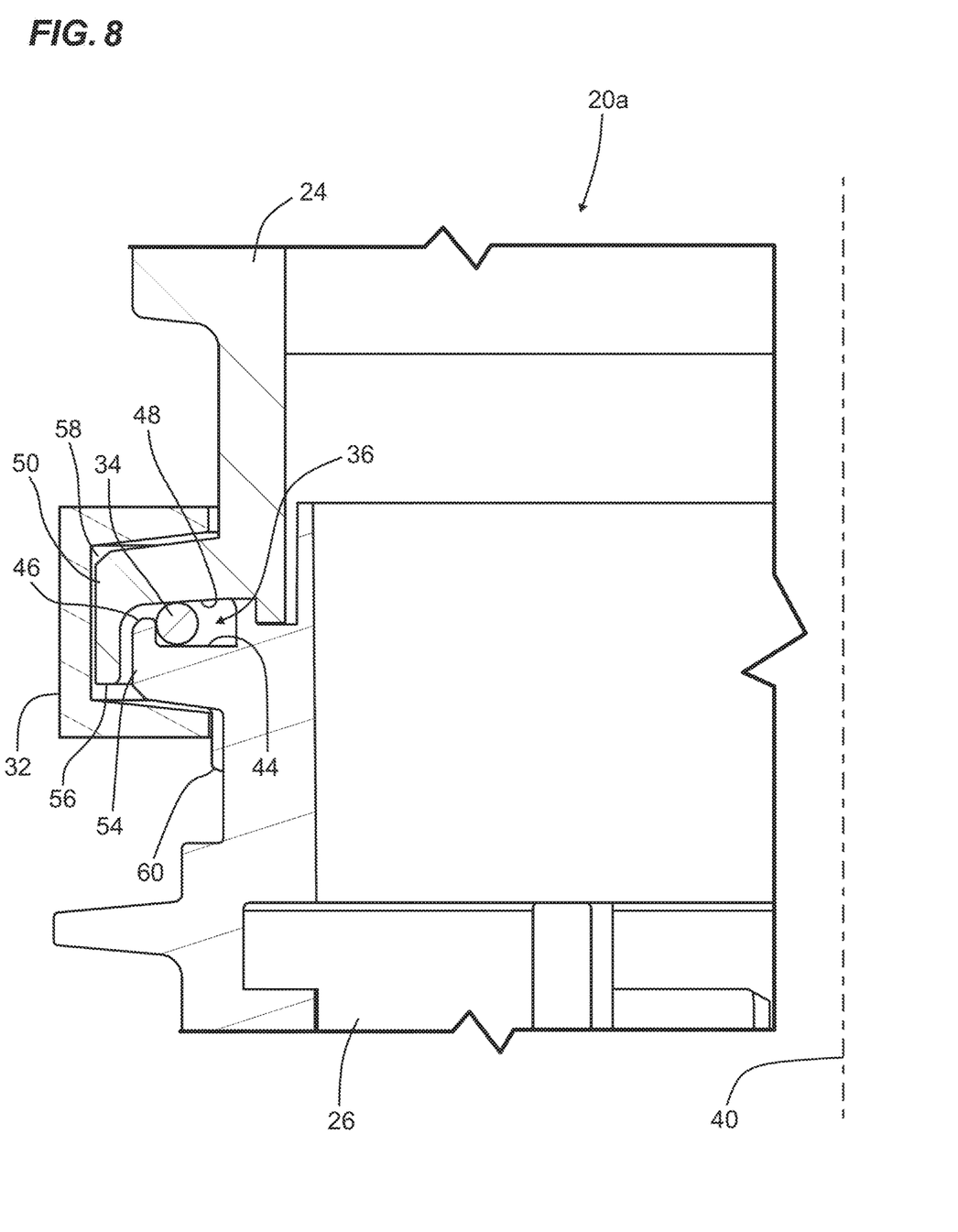
FIG. 8 is a cross-sectional schematic view of a portion of an alternative telecommunications enclosure including a seal in accordance with the principles of the present disclosure.
Figure 9:
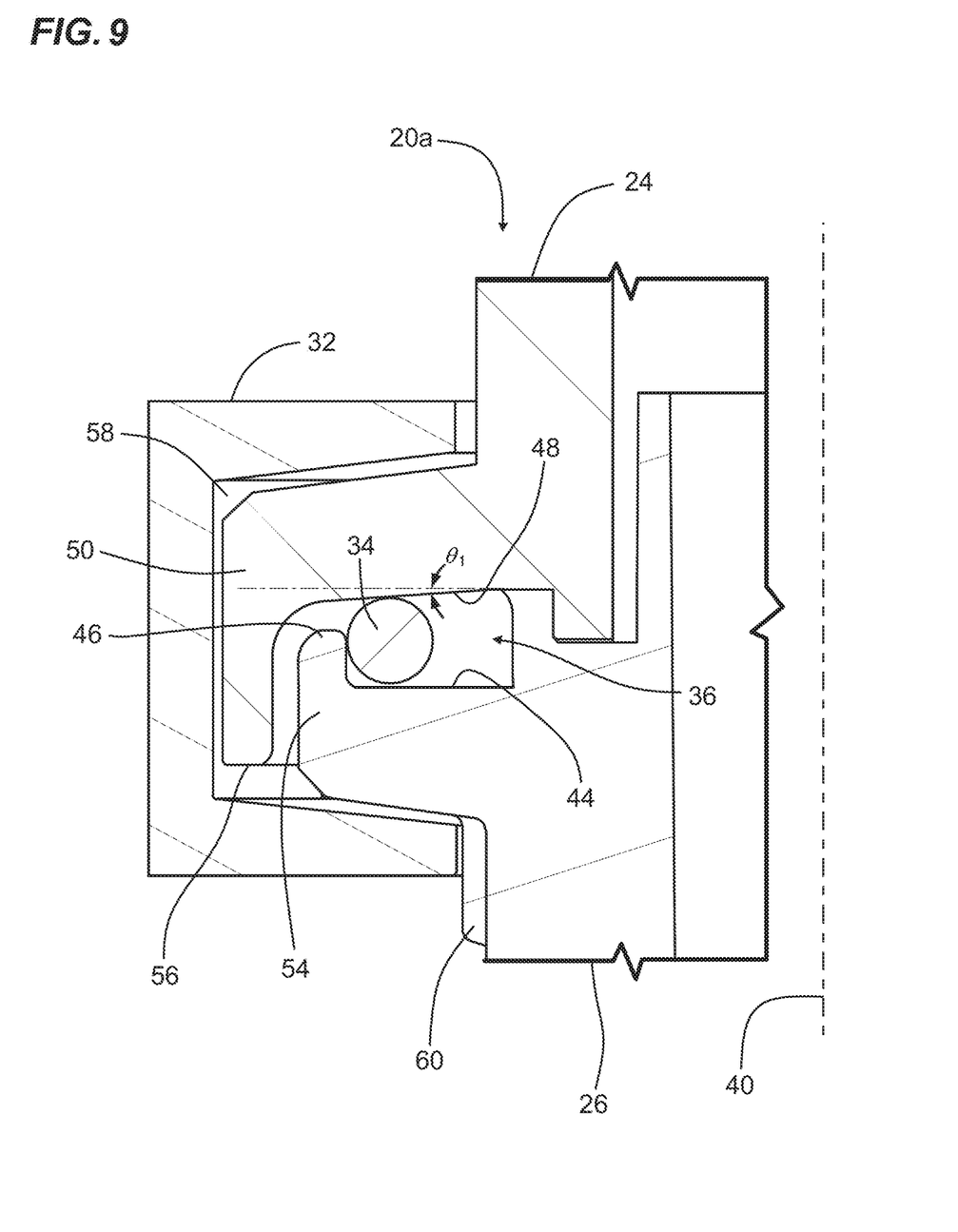
FIG. 9 is an enlarged view of a portion of the telecommunications enclosure of FIG. 8.

Turning to FIGS. 8-9, an alternative embodiment of a telecommunications enclosure 20a is depicted. For the sake of brevity, only those portions of this telecommunications enclosure 20a that differ from the telecommunications enclosure 10 illustrated in FIGS. 1-7 discussed above will be described in detail. Thus, similar components of the telecommunications enclosure 20a that correspond to the respective components of the telecommunications enclosure 10 will not be explained in detail again.

In the telecommunications enclosure 20a shown, the seal containment surface 48 of the dome 24 angles downwardly as the seal containment surface 48 of the dome 24 extends radially away from the central axis 40. In this example, the channel bottom surface 44 of the base 26 may be horizontal. That is, the channel bottom surface 44 of the base 26 may not have a taper or angled incline.

In certain examples, the seal containment surface 48 may have an inclination angle $\theta_1$ of at least 2 degrees to provide more compression and enhanced containment of the environmental seal 34 when the dome 24 and the base 26 are mounted together, although alternatives are possible. In certain examples, the seal containment surface 48 may have an inclination angle $\theta_1$ of at least 3 degrees to provide more compression and enhanced containment of the environmental seal 34 when the dome 24 and the base 26 are mounted together, although alternatives are possible. In certain examples, the seal containment surface 48 may have an inclination angle $\theta_1$ of at least 4 degrees to provide more compression and enhanced containment of the environmental seal 34 when the dome 24 and the base 26 are mounted together, although alternatives are possible. In certain examples, the seal containment surface 48 may have an inclination angle $\theta_1$ of at least 5 degrees to provide more compression and enhanced containment of the environmental seal 34 when the dome 24 and the base 26 are mounted together, although alternatives are possible.

When the clamp 32 is tightened, the clamp 32 pushes the dome 24 and the base 26 together as the clamp 32 rides on the outer flanges 50, 54 of the dome 24 and base 26. As the clamp 32 tightens, the seal containment surface 48 can be angled downwardly to help contain the environmental seal 34. That is, if the environmental seal 34 starts to move, the angled seal containment surface 48 can help to contain the environmental seal 34 rather than allow the environmental seal 34 to move parallel thereto and breach containment by extruding between the outer flanges 50, 54.

Figure 10:
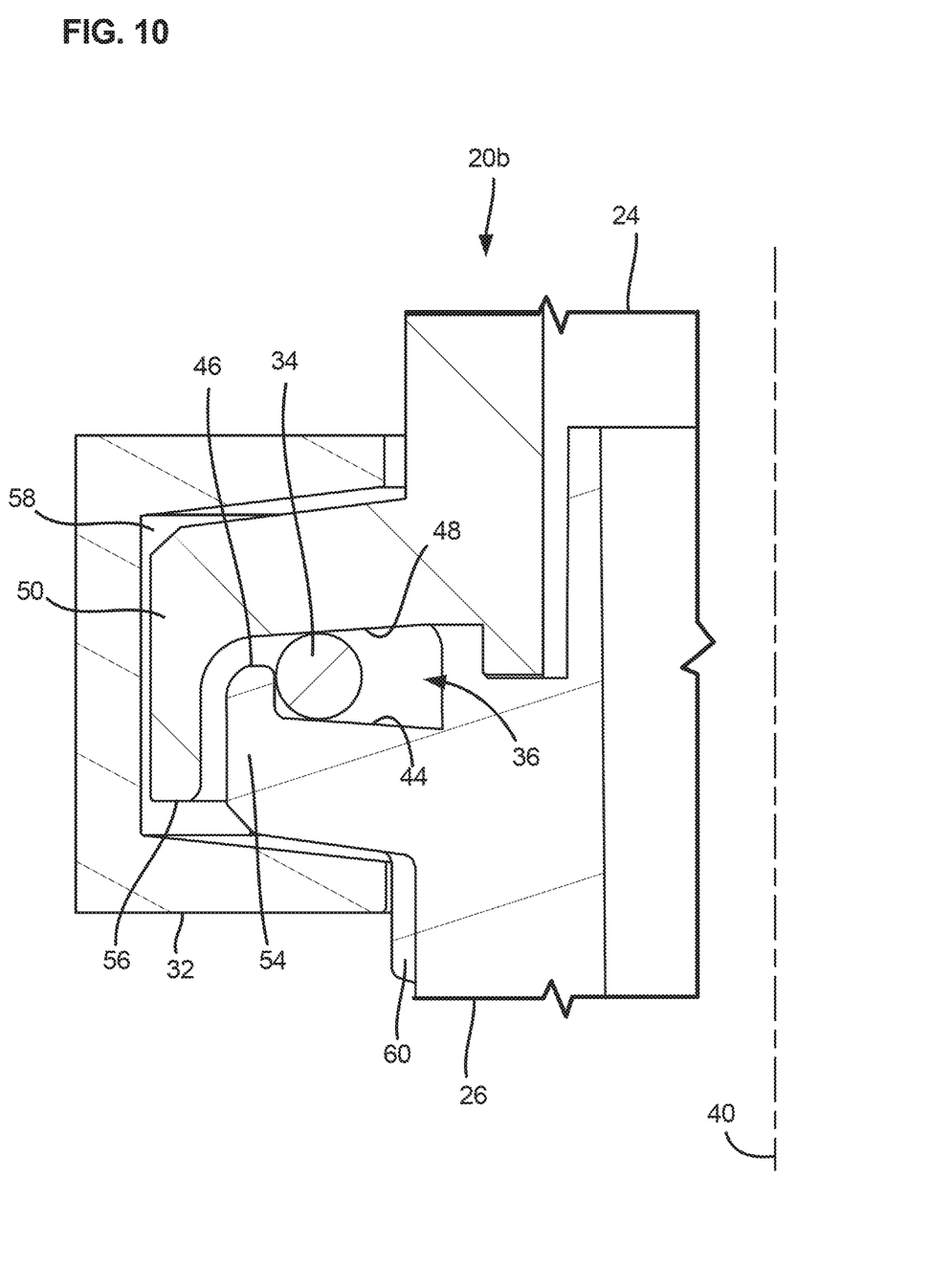
FIG. 10 is a cross-sectional schematic view of a portion of an alternative telecommunications enclosure including a seal in accordance with the principles of the present disclosure.

Referring to FIG. 10, an alternative embodiment of a telecommunications enclosure 20b is depicted. For the sake of brevity, only those portions of this telecommunications enclosure 20b that differ from the telecommunications enclosures 20, 20a illustrated in FIGS. 1-9 discussed above will be described in detail. Thus, similar components of the telecommunications enclosure 20b that correspond to the respective components of the telecommunications enclosures 20a, 20b will not be explained in detail again.

In the telecommunications enclosure 20b shown, the seal containment surface 48 of the dome 24 is angled downwardly as the seal containment surface 48 of the dome 24 extends radially away from the central axis 40 and the channel bottom surface 44 of the base 26 is angled upwardly as the channel bottom surface 44 extends radially away from the central axis 40. That is, the seal containment surface 48 and the channel bottom surface 44 can together form a V shape when the dome 24 and the base 26 are mounted together. The seal containment surface 48 and the channel bottom surface 44 can be adapted to contain the environmental seal 34 within the seal channel 36 because when the dome 24 and the base 26 are mounted together, the seal containment surface 48 angles downwardly while the channel bottom surface 44 angles upwardly. The channel bottom surface 44 and the seal containment surface 48 together can help to prevent movement of the environmental seal 34 outside of the dome 24 and base 26.

As used herein, for ease of explanation, parts have been described as upper and lower. These terms are not to be construed as limiting to the extent enclosures of the type described herein cam be mounted in any orientation.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A telecommunications enclosure comprising:
   an upper dome having a cylindrical lower end centered about a central axis;
   a lower base that mounts at the cylindrical lower end, the lower base including a seal channel that encircles the central axis when the lower base is mounted at the lower end of the upper dome, the seal channel having an open top opposite from a channel bottom surface, the channel bottom surface extending radially outwardly to an outer circumferential lip that projects upwardly from the channel bottom surface, the channel bottom surface angling upwardly as the channel bottom surface extends radially away from the central axis to the outer circumferential lip;
   the lower end of the upper dome and an upper end of the lower base including outer flanges that extend circumferentially about the central axis and that are adjacent to one another when the upper dome and the lower base are mounted together;
   an O-ring seal that mounts in the seal channel and is compressed between the upper dome and the lower base to provide sealing thereinbetween; and
   a clamp that mounts about the outer flanges of the upper dome and the lower base, the clamp defining a clamp channel that receives the outer flanges.

2. The telecommunications enclosure of claim 1, wherein the clamp is oval.

3. The telecommunications enclosure of claim 2, wherein the flanges can move less than 2 millimeters relative to the clamp after tightening of the clamp.

4. The telecommunications enclosure of claim 1, wherein the upper dome includes a seal containment surface that encloses the open top of the seal channel when the lower base is mounted to the upper dome.

5. The telecommunications enclosure of claim 4, wherein the seal containment surface is oriented along a reference plane perpendicular relative to the central axis.

6. The telecommunications enclosure of claim 5, wherein the upper dome includes a downwardly projecting circumferential lip that extends outside and exterior of the circumferential lip of the lower base.

7. A telecommunications enclosure comprising:
   an upper dome having a cylindrical lower end centered about a central axis;
   a lower base that mounts at the cylindrical lower end, the lower base including a sealing surface that encircles the central axis when the lower base is mounted at the lower end of the upper dome;
   the lower end of the upper dome and an upper end of the lower base including outer flanges that extend circumferentially about the central axis and that are adjacent to one another when the upper dome and the lower base are mounted together;
   an O-ring seal that is compressed between the upper dome and the lower base to provide sealing thereinbetween; and
   a clamp that mounts about the outer flanges of the upper dome and the lower base, the clamp defining a clamp channel that receives the outer flanges;
   the upper dome includes a sealing surface that opposes the sealing surface of the lower base when the lower base is mounted to the upper dome, wherein an O-ring seal is compressed between the sealing surface of the upper dome and the sealing surface of the lower base, and wherein the sealing surface of the lower base angles upwardly as the sealing surface of the lower base extends radially away from the central axis or the sealing surface of the upper dome angles downwardly as the sealing surface of the upper dome extends radially away from the central axis.

8. The telecommunications enclosure of claim 7, wherein at least one of the upper dome or the lower base includes a containment lip that circumferentially surrounds the O-ring.

9. The telecommunications enclosure of claim 8, wherein the upper dome includes a downwardly extending circumferential lip and the lower base includes an upwardly extending circumferential lip, and wherein the upwardly and downwardly extending circumferential lips overlap one another when the upper dome and the lower base are secured together.

10. A telecommunications enclosure comprising:

a dome having an open end and a closed end;

a hollow base that mounts at the open end of the dome with the base and the dome aligned along a common central axis, the base including a seal channel that extends around the central axis, the seal channel having an open side opposite from a channel bed, the channel bed extending outwardly from the central axis to an outer lip that projects from the channel bed in a direction toward the dome, the channel bed angling toward the dome as the channel bed extends away from the central axis to the outer lip and the outer lip extending about the central axis;

the dome and the base including outer flanges that extend about the central axis and that are adjacent to one another when the dome and the base are mounted together;

a seal that mounts in the seal channel and is compressed between the dome and the channel bed of the base to provide sealing thereinbetween; and a clamp that mounts about the outer flanges of the dome and the base, the clamp defining a clamp channel that receives the outer flanges.

11. The telecommunications enclosure of claim 10, wherein the dome and the base have cross-sectional profiles that are circular.

12. The telecommunications enclosure of claim 11, wherein the seal is an O-ring seal having a circular cross-section prior to being compressed between the base and the dome.

* * * * *